(No Model.) 3 Sheets—Sheet 1.
W. SUTTON.
TRUCK FOR ELECTRIC CARS.
No. 531,575. Patented Dec. 25, 1894.
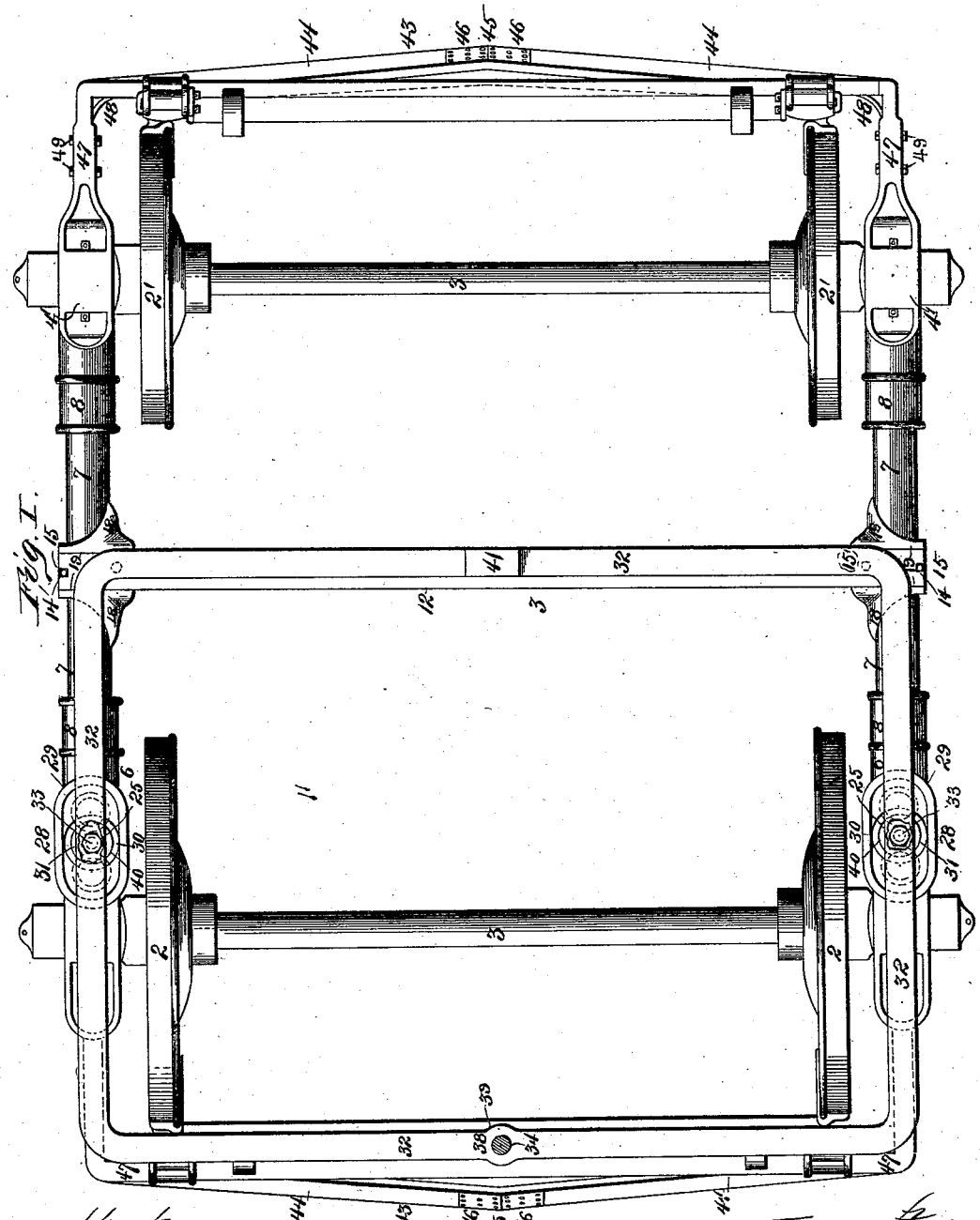
Attest:
Benj. A. Knight.
Inventor:
William Sutton.
By Knight Bros.
Attys.

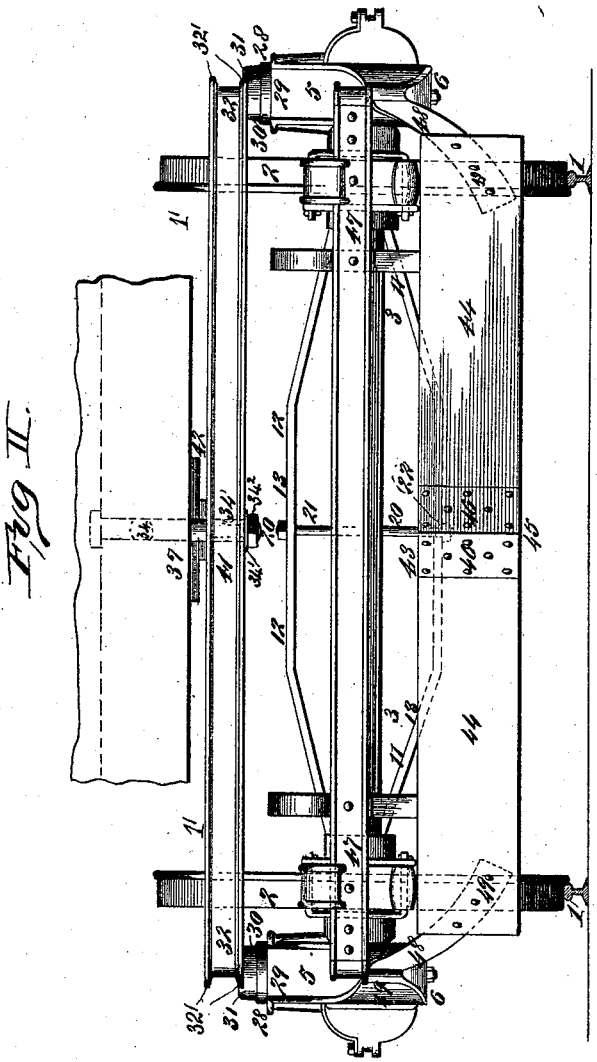

(No Model.) 3 Sheets—Sheet 3.
W. SUTTON.
TRUCK FOR ELECTRIC CARS.
No. 531,575. Patented Dec. 25, 1894.
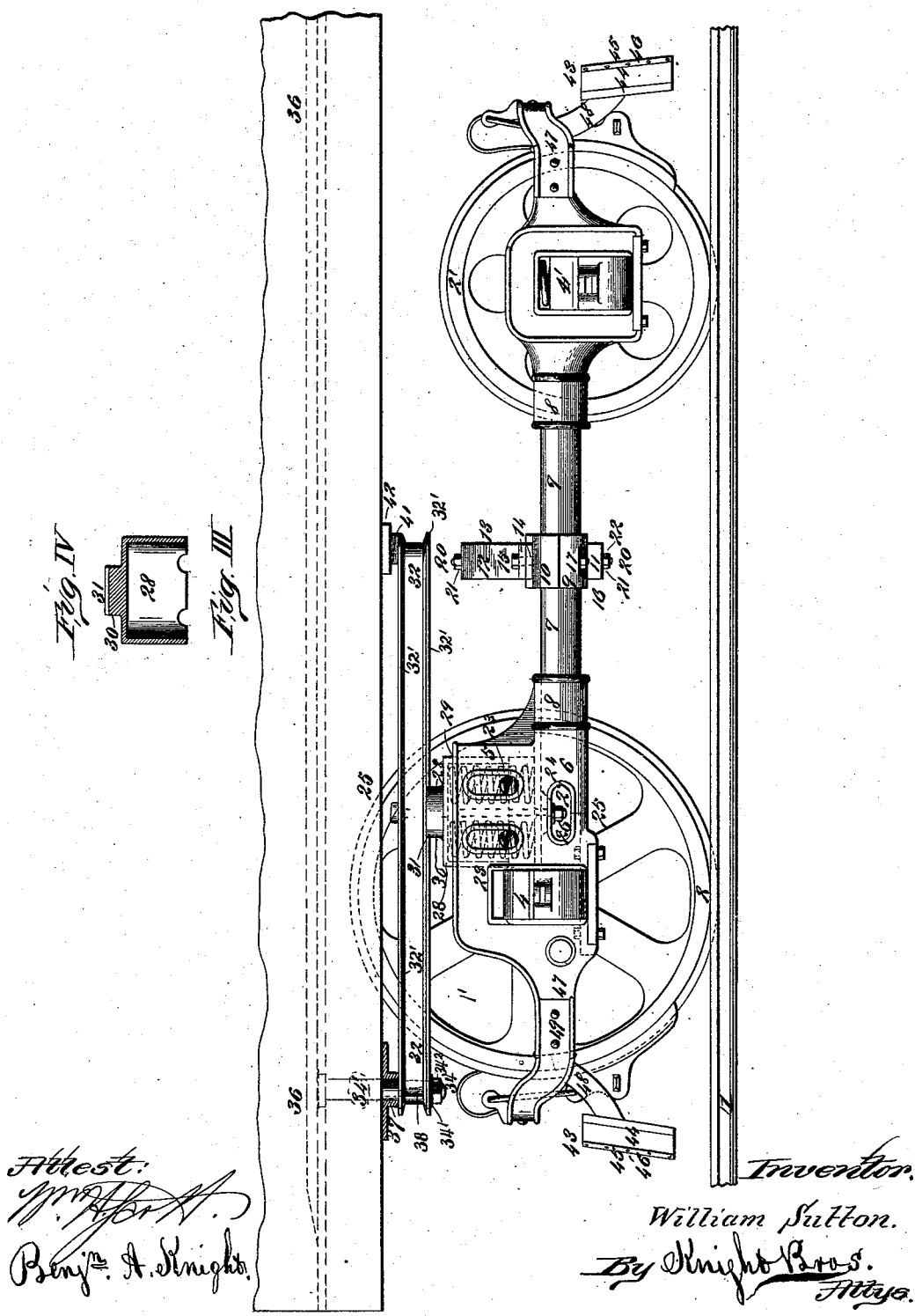
Inventor.
William Sutton.
By Knight Bros.
Attys.
Attest:
Benj. A. Knight.

UNITED STATES PATENT OFFICE.

WILLIAM SUTTON, OF ST. LOUIS, MISSOURI.

TRUCK FOR ELECTRIC CARS.

SPECIFICATION forming part of Letters Patent No. 531,575, dated December 25, 1894.

Application filed February 19, 1894. Serial No. 500,662. (No model.)

*To all whom it may concern:*

Be it known that I, WILLIAM SUTTON, of the city of St. Louis, in the State of Missouri, have invented a certain new and useful Improvement in Trucks for Electric Cars, of which the following is a full, clear, and exact description, reference being had to the accompanying drawings, forming part of this specification.

This system relates to a dual system of pivoted integral horizontal frames, the lateral sides of which are respectively elevated and secured on dual spring mounted pedestals above the respective front and rear trucks, the traction driving wheels of each respective truck being in the lead of its pony trailing wheels, the respective front bars of said integral elevated frame being pivotally secured to the bottom of the surmounting car in each case forward of the driving wheels of the respective carrier truck that said frame surmounts and friction pedestals that respectively surmount the rear bar of each of said integral pivoted frames and engage with their respective rub-plates that hang pendent from said car bottom, the respective front and rear pedestal boxes in each truck connected by tubular tension tie beams to which tie beams are secured the motor carrier frames of their respective trucks, and the invention consists in features of novelty hereinafter fully described and pointed out in the claims.

Figure I is a plan view of the truck with the car removed. Fig. II is a front elevation of the truck, and shows the dual side supporting frame, and the free housing of the motor frame between said dual side bearings. Fig. III is a side elevation of the car truck and shows one of the dual spring housings of the side supporting frame, and Fig. IV is a detail section and shows the spring housing cap that covers the supporting springs.

Referring to the drawings:—1 represents the rail trucks, and 1' represents the respective forward and rear trucks, that respectively support the forward and rear ends of the car and their respective elements of connection and pivotal frame, means of attachment, and other devices in relation to said respective forward and rear supporting trucks, and the forward and rear moieties of the car bed thus pivotally mounted as the respective motor carrier frames mounted on the tubular tie beams of said respective trucks are each respective counter-parts of the other dual moieties of said described construction. Therefore it is to be understood their showing and description and indicating numerals are the equivalents also of the said dual counter-parts. 2 2', respectively are the driving and trailing truck wheels that run on said tracks. 3 and 3' are respectively the axles on which said driving and trailing wheels are fast mounted, and 4 4' respectively represent the spring bearer pedestal boxes in which said respective axles have their bearings.

5 represents the compound pedestal frames that surmount the truck and support the car. 6 are the tubular bases of said pedestals, that unite their dual sides.

7 are tubular tension tie beams, the ends of which are inserted by machine power in their tight tension seats in the respective forward and rear tube holder corresponding clutch ends 8, that connect with the pedestal boxes, and make an efficient juncture of the rear to the forward running gears of the supporting truck at each end of the car.

9 represents the lower and 10 the upper clutches of the grip holder clamp that embrace around said tubular tie beams 7.

11 are the base bars or bar, and 12 the surrounding bars or bar of the angle shaped motor carrier frame 13, the conjoint double perforate ends 14 of which bars are secured by the screw bolts 15 and nuts 16 through the perforate duplicate flanges 17 on each side of said grip-holders, through which said bolts pass.

18 represents wing flanges that surmount the grip holder clamps, and which wing flanges have raised square edged shoulder blades 19 that firmly brace against the upper bars 12 of said motor carrier frame 13, and constitute reinforce braces to said motor frame.

20 are the central vertical tie bolts, which are seated in the perforate centers 21 of said respective base and surmounting bars of the motor carrier frame 13, and are there secured by the screw nuts 28.

43 are the respective end life guards, the angle plates 44 of which are secured together at their junction by the coupling plates 45 and rivets 46, and said respective life guard is attached at each end of the truck to the main truck frame 47 by the attachment bars 48 and screw bolts or rivets 49.

Some of the above elements are embraced in another pending application of mine now on file before the Patent Office, but they also enter into intimate combination with especially prominent elements of the present invention and application, that I will now describe.

23 represents twin spiral supporting springs that rest on the platform 24, within the double walls of each of the aforesaid dual compound pedestal frames 5, on each side of the double car truck, both over the forward and rear divisions of said double truck, the said platform being sustained by the large pendent screw bolt 25 with its screw nut 26 and washer 27.

28 represents spring housing caps which sit down within the open apertures 29 in the top of the compound pedestal frames 5 on each side of the car truck, and the tops of which housing caps rest on said twin spiral supporting springs 23. 30 are upholder pedestals that are integral with and surmount the top of said caps, and 31 are integral holder lugs, that project upward from the outer side of said pedestal.

32 represents a four sided horizontal integral frame, which frame has heavy integral strengthening flanges 32' that project horizontally and integrally in continuous course respectively from the bottom and the top of said horizontal four sided frame. (See Figs. I, II and III.) The lateral sides of said frame midway of their length are seated on said upholder pedestals 30, on the surmounting cap housings 28 that are elastically supported by the dual systems of twin spiral springs 23 and are there securely held between the said upwardly projecting side lugs 31 of said pedestals, by the aforesaid vertical bolts 25, that pass through their perforate seats 33 in said horizontal integral frame 32, and as aforesaid through said twin spiral spring platforms, through said large holder washers 27 where they are secured by said screw nuts 26. The mounting of said integral horizontal frame 32 on said upholder pedestals 30, elevates said frame about midway between the top of the dual twin supporting springs and the surmounting car bed 35, with which said elevated frame 32 and its counterpart beneath the other end of the car are respectively pivotally connected and thus constitute said frames with their subsidiary elements intervening supporting frames midway between said dual supporting springs and the car bed supported thereby.

34 represents the respective pivotal coupling bolts, which are seated in their respective bolt holes and pivot bearings in the bed 35 of the surmounting car or carriage 36, in their respective intervening combined bolster plates and pedestal bearing tubes 37, and in their pivot bearing seats 38, midway of the front bar of said integral supporting frame 32, and the projecting screw tip of said pivotal coupling bolt is secured by the washer 34' and the screw nut 34² from vertical displacement, the said frame having a reinforce swell 39 around said coupling bolt pivot bearing 38 in said frame, and the side bars of said frame may have like reinforce swells 40 where they are perforated for the passage of the combined stay and supporting bolts 25, the respective pivotal attachment of the horizontal frames 32 to the car-bed floor in each case (see Figs. I, II and III) being midway transversely of the car bed, and forward respectively of the traction driving wheels of the respective truck in each case that said frame surmounts.

41 represents friction pedestals that integrally surmount the rear bar of the integral horizontal supporting frame 32, and 42 are metal rub plates that are secured beneath the bed of the car or carriage immediately above each of the friction pedestals 41, and consequently when the respective trucks turn to switch or turn a curve, said respective elevated supporting frames 32 turn with the respective trucks that bear them, and the pivot ends of the coupling pivot bolts 34, that hang pendent from near the respective ends of the surmounting car bed, have free rotary pivot bearings in the combined bolster plates and pedestal tubes 37, and through the front sides respectively of said integral supporting frames 32, while the respective ends of the long surmounting car body avoid the jars consequent on sudden turns by means of their respective pivotal coupling to the front sides of said respective supporting frames 32 and by the movement of the pendent rub plates 42 on the friction pedestal 41 that surmounts the rear sides of said respective supporting frames, allowing time for a gradual easy turn of the car body out of line and into line again with said supporting frames and trucks on which they are mounted. Now it will be seen that by the use of said dual system of supporting spiral springs within the compound pedestals on each side of the trucks and both over the forward and rear trucks, and also by the use of the four sided integral elevated supporting frame 32, having an open space within its sides, and also the tubular bases 6, the tubular tie beams 7 and the tube holder tension joints 8 that connect said tubular tie beams to the pedestal frames, the said tubular parts being braced to themselves and by other elements of the invention, and by making the respective pivotal coupling connections of the surmounting car to said supporting elevated frame 32 forward of the traction driving wheels which also largely increases their traction, the whole intervening space is left open, both for the location of the motor and its frame, as also for ready access thereto. The said dual supports on each side of the double truck also hold said supporting frames from lateral sway, and as the car or carriage but slightly surmounts said supporting frames, and is also steadied by the friction pedestals 41, against the underlying bars 42, said car or carriage rides very steadily on its truck support and running gears.

I claim as my invention—

1. In a truck for electric cars, the combination of the traction driving wheels, the pony trailing wheels, the dual supporting springs 23, the spring housing caps 28, the upholder pedestals 30 having the holder lugs 31, the intervening integral supporting frame 32 having the integral horizontal projecting flanges 32' and the car or carriage 36 supported by said elements; substantially as shown and described.

2. In a truck for electric cars, the combination of the traction drive wheels, the pony trailing wheels, the dual supporting springs 23, the spring housing caps 28, the upholder pedestals 30 having the holder lugs 31, the intervening supporting frames 32 elevated on said pedestals midway between said springs and the car bed, the pedestals 37, the friction pedestals 41, the rub plates 42, and the car or carriage 36; substantially as shown and described.

3. In a dual truck for electric cars, the combination of the spring bearer pedestal boxes 4, the compound pedestal frames 5, having the tubular bases 6, the tubular tension tie beams 7, the tube holder clutches 8 in which said beams are tension-seated, the spring bearer platform 24 within said compound pedestal frames, the dual side supporting springs 23 seated on said platforms, the spring housing caps 28, the pedestals 30, the intervening supporting frames 32, the coupling bolts 34, the pedestals 37, the friction pedestals 41, the bars 42, and the car or carriage supported by said means: substantially as shown and described.

4. In a truck for electric cars, the combination of the spring bearer pedestal boxes 4, the compound pedestal frames 5, having the tubular bases 6, the tubular tension tie beams 7, the tubular holder clutches 8, in which said beams are tension held, the lower and upper clutches 9 and 10 of the grip holder clamps on said tie beams, the screw bolts 15, the motor carrier frame 13, the dual side supporting springs 23 the spring housing caps 28, the surmounting pedestals 30, the intervening supporting frames 32, and the car or carriage supported thereby, leaving a clear intervening space between said tie-beams 7 for the carriage of and access to the motor frames; substantially as shown and described.

5. In a truck for electric cars, the combination of the spring bearer pedestal boxes 4, the compound pedestal frames 5, the tubular tension tie beams 7, the tube holder clutches 8 in which said beams are tension held, the lower and upper clutches 9 and 10, of the grip holder clamps on said tie-beams, the screw bolts 15, the motor carrier frame 13, having the base and surmounting bars 11 and 12, the central vertical tie bolts 20, the wing flanges 18, the brace shoulder blades 19, the dual side supporting springs housed in said compound pedestal on each side of said truck, the spring housing caps 28, having the surmounting pedestals 30, the supporting frames 32, and the car or carriage supported thereby, leaving a clear intervening space between said tie-beams for the carriage of and access to the motor frames; substantially as shown and described.

WILLIAM SUTTON.

In presence of—
EMIL ALEXANDER,
BENJN. A. KNIGHT.